(12) United States Patent
Koduri et al.

(10) Patent No.: US 11,374,768 B2
(45) Date of Patent: Jun. 28, 2022

(54) METHOD AND SYSTEM FOR REAL-TIME DRIVING ALERTS

(71) Applicant: MASTERCARD INTERNATIONAL INCORPORATED, Purchase, NY (US)

(72) Inventors: Aditya Koduri, Haryana (IN); Rakesh Patel, Haryana (IN); Jaipal Singh Kumawat, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 430 days.

(21) Appl. No.: 16/437,210

(22) Filed: Jun. 11, 2019

(65) Prior Publication Data

US 2020/0396083 A1  Dec. 17, 2020

(51) Int. Cl.
| | |
|---|---|
| *H04L 9/32* | (2006.01) |
| *G06F 16/27* | (2019.01) |
| *G07C 5/08* | (2006.01) |
| *H04L 9/06* | (2006.01) |
| *H04L 9/30* | (2006.01) |

(52) U.S. Cl.
CPC ............ *H04L 9/3247* (2013.01); *G06F 16/27* (2019.01); *G07C 5/085* (2013.01); *H04L 9/0637* (2013.01); *H04L 9/30* (2013.01); *H04L 2209/38* (2013.01)

(58) Field of Classification Search
CPC ....... H04L 9/3247; H04L 9/0637; H04L 9/30; H04L 2209/38; G06F 16/27; G07C 5/085
See application file for complete search history.

(56) References Cited

U.S. PATENT DOCUMENTS

| | | | |
|---|---|---|---|
| 2013/0333009 A1* | 12/2013 | Mackler | ................. H04L 63/08 726/7 |
| 2016/0061625 A1* | 3/2016 | Wang | ................. G01C 21/3697 701/454 |
| 2016/0330027 A1* | 11/2016 | Ebrahimi | .............. H04L 9/3239 |
| 2016/0342989 A1* | 11/2016 | Davis | ................... G06Q 20/385 |
| 2017/0032673 A1* | 2/2017 | Scofield | ............ H04B 7/18504 |
| 2017/0132625 A1* | 5/2017 | Kennedy | ............. G06F 16/2379 |
| 2017/0132630 A1* | 5/2017 | Castinado | ............ G06Q 20/385 |
| 2017/0163733 A1* | 6/2017 | Grefen | .................... H04L 67/20 |
| 2017/0177898 A1* | 6/2017 | Dillenberger | ........... G06F 16/27 |

(Continued)

*Primary Examiner* — Yonas A Bayou
(74) *Attorney, Agent, or Firm* — Buchanan Ingersoll & Rooney PC (57) ABSTRACT

A method for tracking rash driving includes: receiving a plurality of rider embarkation notifications, each including a digital signature and a vehicle identifier; generating a new block for a blockchain, the new block including a block header and a plurality of blockchain data values, each blockchain data value corresponding to a rider embarkation notification and including the respective digital signature; receiving a rash driving notification including the vehicle identifier; transmitting a confirmation request to at least one mobile computing device associated with one of the plurality of rider embarkation notifications; receiving a confirmation message from one of the at least one mobile computing devices; and generating a subsequent block for the blockchain, the subsequent block including a new block header and a new data value, the new data value including an indication of rash driving.

16 Claims, 6 Drawing Sheets

(56) References Cited

U.S. PATENT DOCUMENTS

| | | | |
|---|---|---|---|
| 2017/0228371 A1* | 8/2017 | Seger, II | G06F 21/64 |
| 2017/0236123 A1* | 8/2017 | Ali | H04L 45/7453 |
| | | | 705/75 |
| 2018/0299284 A1* | 10/2018 | Wang | G01C 21/3694 |
| 2020/0145191 A1* | 5/2020 | Qi | H04W 12/06 |

* cited by examiner

FIG. 5

METHOD AND SYSTEM FOR REAL-TIME DRIVING ALERTS

FIELD

The present disclosure relates to tracking rash driving, specifically the use of a blockchain to track riders that embark and disembark from a vehicle, such as a public transportation vehicle, to enable riders to be contacted to confirm reported instances of rash driving by the vehicle.

BACKGROUND

At any given time, there are hundreds of millions of vehicles on the roads of the world. While many drivers consider themselves to be above average, thousands upon thousands of accidents occur every day for a variety of reasons, such as malfunctions, mistakes, natural disasters, inclement weather, or driver error. In some cases, an accident may be unavoidable and a result of bad luck for the driver. In an effort to remain safe on the road, one of the biggest protective measures a driver can take is to be cautious and wary of other drivers.

When a driver is driving erratically or in an otherwise dangerous manner, it can put hundreds of other lives at risk, particularly on congested roadways. In cases where a driver has passengers, there may be an immediate risk to the passengers even if there are no other vehicles on the road. However, in many cases, there is a lack of methods to report rash driving on the part of a vehicle operator. Some companies and businesses may provide a telephone number that a passenger or onlooker can call to report rash driving. While such reports may provide useful background information, independent, anonymous reporting can be unreliable as it is typically unverifiable. Also, thought he call might be recorded and possibly entered into a database, there is no assurance that it will be accurately recorded and unchanged when it might need to be relied upon di to the technical limitations of databases even if guarded with technology that governs user rights, access rights and audit rights.

Thus, there is a need for a technical system that enables reporting of rash driving of public vehicles to be made where such reports can be verified through confirmed passengers of a vehicle to ensure accuracy of rash driving reports.

SUMMARY

The present disclosure provides a description of systems and methods for tracking rash driving. A blockchain is used to track passengers of a vehicle, where passengers that get on to a vehicle use a blockchain wallet to register their passenger status, and, in some cases, also use their wallet when exiting the vehicle so there is a record of when the passenger was on the vehicle. When a rash driving alert is received from a passenger or from an onlooker to the vehicle, the blockchain can be used to identify passengers that were on the vehicle when the rash driving was observed. The passengers can then be contacted to provide verification of the rash driving or to dispute the rash driving. The results of the investigation can also be stored on the blockchain to provide for immutability and transparency of the rash driving as a public driving record for the vehicle operator. As such, vehicle operators are incentivized to drive carefully and safely, there is an easy mechanism for reporting rash driving, and inaccurate or inauthentic reports can be easily identified and prevented from being accepted. The result is safer driving, resulting in greater safety to passengers and other drivers on the road.

A method for tracking rash driving includes: receiving, by a receiver of a processing server, a plurality of rider embarkation notifications, wherein each rider embarkation notification includes at least a digital signature and a vehicle identifier; generating, by a processing device of a processing server, a new block for a blockchain, wherein the new block includes at least a block header and a plurality of blockchain data values, where each blockchain data value corresponds to a rider embarkation notification and includes at least the respective digital signature; receiving, by the receiver of the processing server, a rash driving notification, wherein the rash driving notification includes at least the vehicle identifier; transmitting, by a transmitter of the processing server, a confirmation request to at least one mobile computing device associated with one of the plurality of rider embarkation notifications; receiving, by the receiver of the processing server, a confirmation message from one of the at least one mobile computing devices; and generating, by the processing device of the processing server, a subsequent block for the blockchain, wherein the subsequent block includes at least a new block header and a new data value, where the new data value includes at least an indication of rash driving.

A system for tracking rash driving includes: a receiver of a processing server configured to receive a plurality of rider embarkation notifications, wherein each rider embarkation notification includes at least a digital signature and a vehicle identifier; a processing device of a processing server configured to generate a new block for a blockchain, wherein the new block includes at least a block header and a plurality of blockchain data values, where each blockchain data value corresponds to a rider embarkation notification and includes at least the respective digital signature; and a transmitter of the processing server, wherein the receiver of the processing server is further configured to receive a rash driving notification, wherein the rash driving notification includes at least the vehicle identifier, the transmitter of the processing server is configured to transmit a confirmation request to at least one mobile computing device associated with one of the plurality of rider embarkation notifications, the receiver of the processing server is even further configured to receive a confirmation message from one of the at least one mobile computing devices, and the processing device of the processing server is further configured to generate a subsequent block for the blockchain, wherein the subsequent block includes at least a new block header and a new data value, where the new data value includes at least an indication of rash driving.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Identification and Verification of Rash Driving

Figure 1:
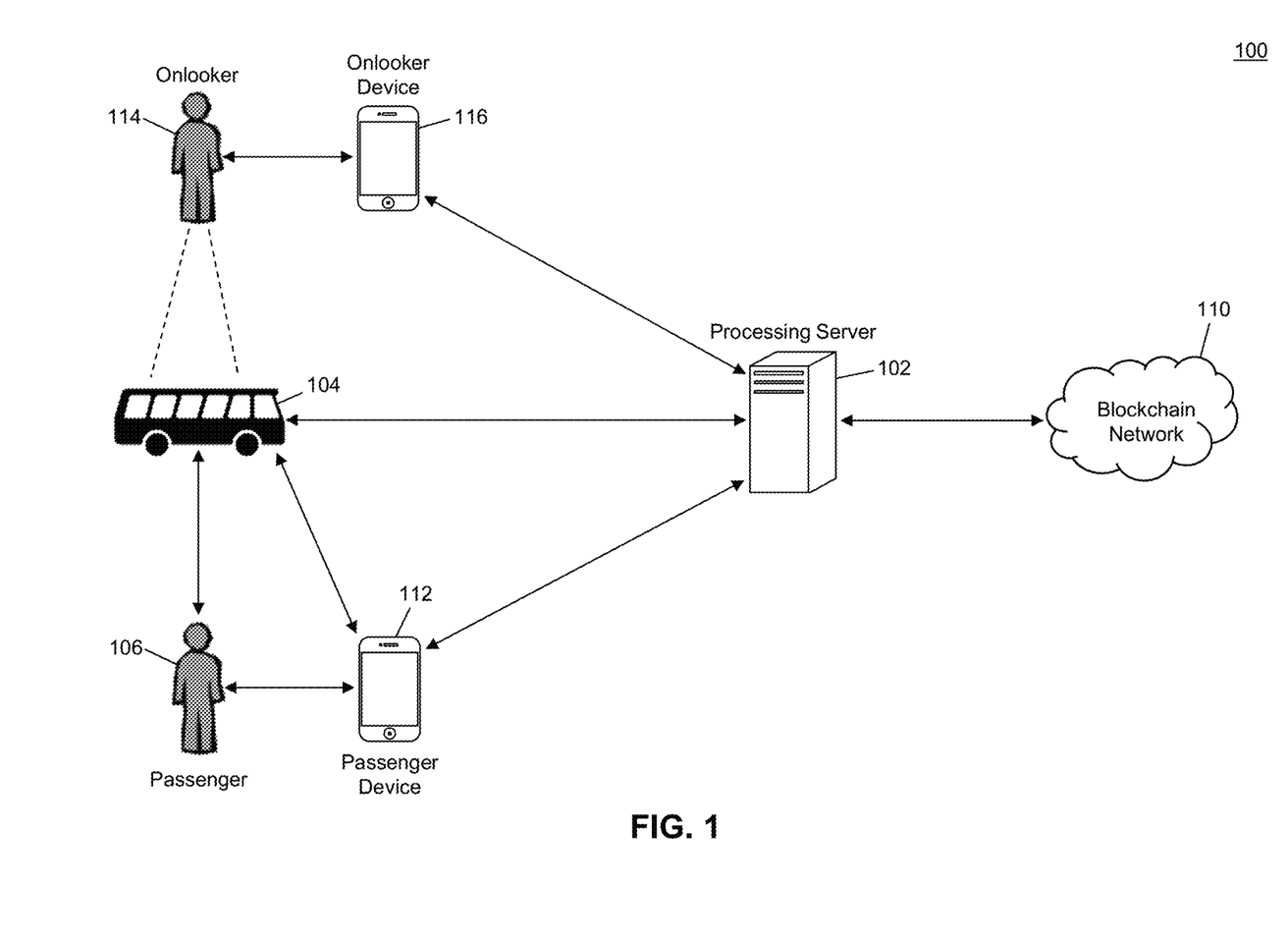
FIG. 1 is a block diagram illustrating a high level system architecture for identifying and verifying rash driving using a blockchain in accordance with exemplary embodiments.

FIG. 1 illustrates a system 100 for the identification of instances of rash driving and the verification thereof by confirmed passengers of a vehicle identified using a blockchain.

The system 100 may include a processing server 102. The processing server 102, discussed in more detail below, may be configured to receive reports of rash driving of a vehicle 104, where the reports can verified by passengers 106 of the vehicle 104 that are confirmed to be passengers at the time the rash driving (i.e., any operation of a vehicle that might be unsafe including speeding, swerving, aggressive driving, inattentive driving, accidents, failure to obey traffic regulations or signals, etc.) by a vehicle operator (e.g., driver, train engineer, pilot, etc.) was observed through the use of a blockchain. The vehicle 104 may be any type of vehicle that can accept passengers (e.g., taxi, bus, train, aircraft, etc.). In some cases, the vehicle 104 may be a public transportation vehicle, such as a municipal bus. In the system 100, each passenger 106 of a vehicle 104 may possess a blockchain wallet that they use to register any time they embark the vehicle 104. In an exemplary embodiment, use of blockchain wallets and registration of embarkation and disembarkation may be explicitly permissioned by the passenger 106.

The blockchain wallet may be associated with a blockchain network 110 that is used to store data in entries on a blockchain that is operated and maintained via the blockchain network 110. A blockchain wallet may be an application program that is executed by a passenger device 112, which may be a computing device possessed and/or used by the passenger 106. A blockchain wallet may include a private key of a cryptographic key pair that is used to generate digital signatures that serve as authentication of the passenger 106 for a blockchain data value associated therewith, where the digital signature can be verified by the blockchain network 110 using the public key of the cryptographic key pair. In some cases, the term "blockchain wallet" may refer specifically to the private key. In some embodiments, the private key may be stored by a third party repository. In other embodiments, the private key may be stored on the passenger device 112. The passenger device 112 may be any type of computing device suitable for performing the functions discussed herein, such as a desktop computer, laptop computer, tablet computer, notebook computer, cellular phone, smart phone, smart watch, smart television, wearable computing device, implantable computing device, etc.

The blockchain network 110 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In an exemplary embodiment, the processing server 102 may be a node in the blockchain network 110. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 110 prior to the generation and addition of a new block to the blockchain in order for the change to be made permanent. Computational and communication limitations may make such a modification exceedingly difficult, if not impossible, thus rendering the blockchain immutable.

Each blockchain data value may correspond to a data entry added to the blockchain. In the system 100, data entries may be used to track passenger embarkation on a vehicle 104, disembarkation on a vehicle 104, rash driving incidents, and other data, as discussed below. In an exemplary embodiment, a passenger 106 may be required to opt-in if they want to participate in the tracking of embarkation, disembarkation, etc. Data values that are directly associated with a passenger 106 (e.g., rider embarkation and disembarkation entries) may include a digital signature generated using the private key of the respective passenger's blockchain wallet. Data values that may not be directly associated with a passenger 106 may not include any digital signature, or may include a digital signature of the entity submitting the data value (e.g., the processing server 102 or other node in the blockchain network 110).

When a passenger 106 boards the vehicle 104, they may register their boarding on the blockchain. The passenger 106 may use their passenger device 112 to generate a digital signature that is transmitted to the processing server 102 along with a vehicle identifier associated with the vehicle 104 to register as being a passenger on the vehicle 104. The vehicle identifier may be a value unique to the particular vehicle 104, and may be any suitable type of value, such as an integer or an alphanumeric value. In some cases, the digital signature and vehicle identifier may be submitted to the processing server 102 by the vehicle 104, where the passenger device 112 may transmit the digital signature to the vehicle 104 using a suitable communication method, such as via near field communication, Bluetooth, display of a machine-readable code encoded with the digital signature, etc. In other cases, the digital signature and vehicle identifier may be transmitted to the processing server 102 by the passenger device 112, where the passenger device 112 may receive the vehicle identifier from the vehicle 104 through a suitable communication method, such as input by the passenger 106 or the methods discussed above.

The processing server 102 may receive the digital signature and vehicle identifier. In an exemplary embodiment, the processing server 102 may validate the digital signature using the public key of the blockchain wallet associated with the passenger device 112 using a suitable signature generation algorithm. In such embodiments, if the validation fails, the blockchain data value may not be added to the blockchain. If the validation is successful, a new blockchain data value for the passenger embarkation may be generated and included in a new block that is verified and added to the blockchain. The block header of the new block includes a timestamp, which can be used as an indication of when the passenger 106 boarded the vehicle 104. In some embodiments, the passenger 106 may repeat the process when disembarking from the vehicle 104, where the corresponding blockchain data entry may be included in a block where the timestamp indicates when the passenger 106 left the vehicle 104, providing a time range of when the passenger 106 was a passenger on the vehicle 104. In embodiments where embarkations and disembarkations are both registered on the blockchain, each corresponding data value may include a flag or other data item indicating if the data value corresponds to an embarkation or disembarkation.

In the system 100, someone may witness the vehicle 104 being driven rashly. In some cases, the witness may be a passenger 106. In other cases, the witness may be an onlooker 114 that may not be a passenger on the vehicle, such as another driver, a passenger of another vehicle, a pedestrian, etc. When rash driving is witnessed, a rash driving notification may be submitted to the processing server 102 using a suitable computing device, such as the passenger device 112 for passengers 106 or an onlooker device 116 for an onlooker 114. An onlooker device 116 may be any type of computing device suitable for performing the functions discussed herein. A rash driving notification may include at least the vehicle identifier associated with the vehicle 104, which may be obtained by the onlooker 114 using any suitable method. For instance, the vehicle 104 may broadcast its vehicle identifier for receipt by the onlooker device 116, or the vehicle identifier may be physically displayed on the vehicle 104 for entry into the onlooker device 116 by the onlooker 114. In some instances, the driver of the vehicle 104 may be required to opt-in for display or broadcast of the vehicle identifier for use in reporting rash driving. In some cases, a description or other detail regarding the rash driving may be included in the rash driving notification, such as an entered time, a timestamp, a categorization, a written description provided by the onlooker 114 or passenger 106, a picture, a video, etc.

The processing server 102 may receive the rash driving notification using a suitable communication network and method. The processing server 102 may then attempt to confirm the rash driving incident. In cases where a passenger 106 submits the rash driving notification, confirmation may include verifying that the passenger 106 (e.g., validating using a digital signature included in the rash driving notification) was a passenger 106 on the vehicle 104 at the time of the reporting based on the blockchain data values for embarkation and disembarkation for the passenger 106 on the blockchain. In cases where an onlooker 114 submits the rash driving notification, or where submissions by a single passenger 106 are not considered suitable confirmation, the processing server 102 may seek confirmation from a registered passenger 106 of the vehicle 104 that has opted-in to provide rash driving confirmations.

The processing server 102 may identify every passenger 106 on the vehicle 104 (e.g., that has provided consent for tracking of riding) at the time that the rash driving occurred, by examining the blockchain data values stored in the blockchain that include the vehicle identifier associated with the vehicle 104, as included in the rash driving notification. The processing server 102 may identify each blockchain data value for a rider embarkation before the time of the rash driving, where the associated passenger 106 may be considered to be on the vehicle 104 at the time of the rash driving absent a subsequent rider disembarkation data value for that passenger 106 before the time of rash driving. Once passengers 106 have been identified, the processing server 102 may electronically transmit a confirmation request to the passenger device 112 associated with each respective passenger 106. Passenger devices 112 may be identified through a registration process when the passenger 106 first registers their blockchain wallet, or when the passenger 106 registers their embarkation on the vehicle 104.

Each passenger 106 (e.g., registered for receipt thereof) may receive the confirmation request on their passenger device 112. The confirmation request may include any information needed by the passenger 106 to be able to confirm the alleged rash driving incident, such as the reported time of the rash driving, any description information submitted by the submitter, etc. The passenger 106 may confirm the rash driving either directly as alleged by the submitter, may submit an amended confirmation of the rash driving where the passenger 106 may change the description based on their own interpretation of the event, or may dispute the alleged rash driving such as by indicating that they felt the driving of the vehicle 104 was not rash. The passenger 106 may submit a confirmation message to the processing server 102 via the passenger device 112 that includes a confirmation, amended confirmation, or dispute for the rash driving notification. The processing server 102 may receive confirmation messages from one or more passengers 106. In some cases, the processing server 102 may wait a predetermined period of time for receipt of confirmation messages before performing any further actions regarding rash driving notifications. In some instances, the receipt of confirmation messages from a majority of passengers 106 may supersede a predetermined period of time.

Following the receipt of confirmation messages for a rash driving notification, and after the predetermined period of time, if applicable, the processing server 102 may review the messages to determine if the alleged rash driving is confirmed. In some cases, confirmation may be indicated if a majority or a predetermined percentage of the confirmation messages confirm the rash driving. In some instances, a minimum number of disputes to the alleged rash driving may prevent the alleged rash driving from being confirmed. Determinations as to whether or not rash driving is indicated following the receipt of confirmation messages may be changed or adjusted as necessary following implementation of the system 100.

If rash driving is indicated and confirmed, then the processing server 102 may add a new blockchain data entry to the blockchain that includes a reporting of the rash driving. The blockchain data entry may include at least an indication that rash driving was observed. In some cases, the data entry may further include the vehicle identifier or an identifier associated with the driver of the vehicle 104 at the time the rash driving was observed, such as a public key of the driver's own blockchain wallet or other identification value. In some instances, the blockchain data entry may also include the time at which the rash driving was observed and any description or other data included in the rash driving notification. In cases where confirmation messages may include amended descriptions of the rash driving, the amended descriptions may be included in the blockchain data value, or the processing server 102 may generate a summary of all of the descriptions of the rash driving for inclusion in the blockchain data value.

If the blockchain is made publicly accessible, then passengers 106 and onlookers 114 can easily and accurately identify instances of rash driving by public transportation vehicles 104 and/or their operators. Such information may also be useful in reprimanding or rewarding drivers based on their behavior, or in the modification of insurance rates for drivers or vehicles or public transportation entities. The use of a blockchain to track registered passengers 106 may ensure that only verified passengers of the vehicle 104 can confirm alleged rash driving, thereby reducing the number of inauthentic rash driving reports that are attributed to a vehicle 104 or driver. As a result, the methods and systems discussed herein provide for better accuracy in the reporting of rash driving with less opportunity for inaccurate or fraudulent reports.

Processing Server

Figure 2:
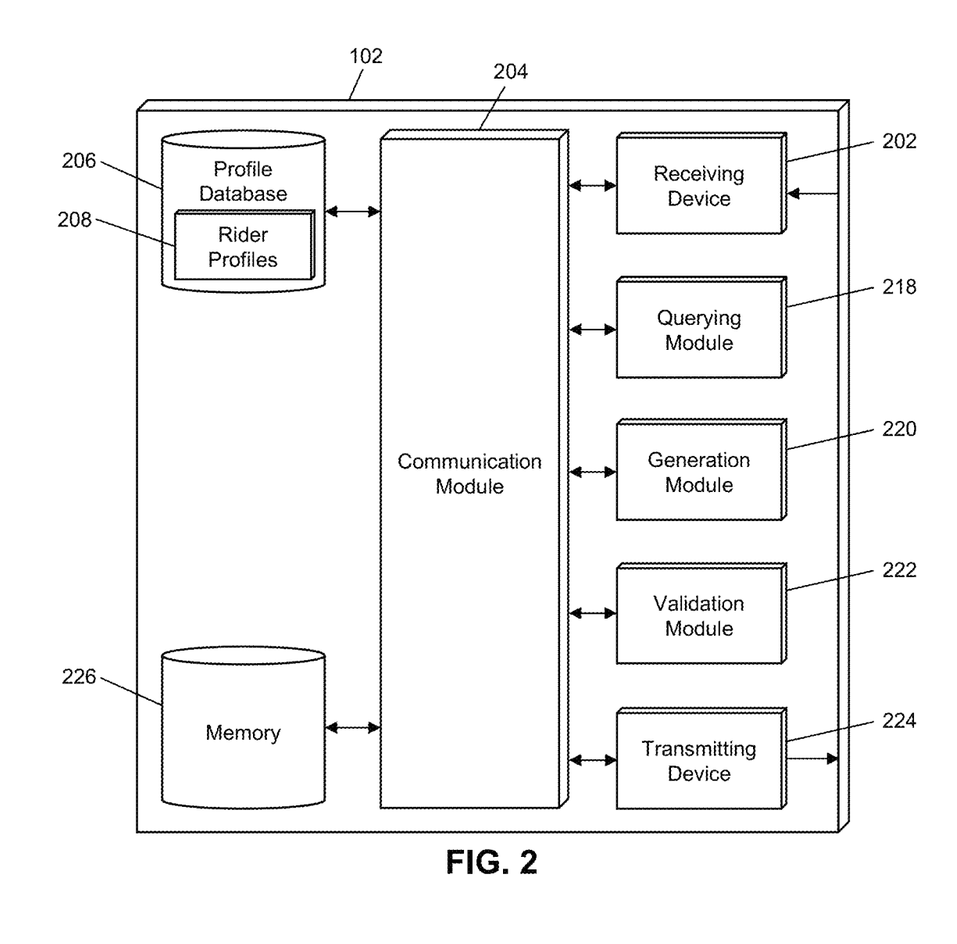
FIG. 2 is a block diagram illustrating the processing server of the system of FIG. 1 for identifying and verification rash driving using a blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from vehicles 104, passenger devices 112, onlooker devices 116, blockchain networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by vehicles 104 and/or passenger devices 112 that may be superimposed or otherwise encoded with rider embarkation or disembarkation notifications, which may include digital signatures and vehicle identifiers. The receiving device 202 may also be configured to receive data signals electronically transmitted by onlooker devices 116 and/or passenger devices 112 that may be superimposed or otherwise encoded with rash driving notifications or confirmation messages, which may include vehicle identifiers, description information, confirmation or disputes or alleged rash driving, or other data as discussed herein. The receiving device 202 may also be configured to receive data signals electronically transmitted by nodes in blockchain networks 110, which may be superimposed or otherwise encoded with new blocks for verification or adding to the blockchain, blockchain data values for verification or inclusion in new blocks, or other data as discussed herein.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a profile database 206. The profile database 206 may be configured to store a plurality of rider profiles 208 using a suitable data storage format and schema. The profile database 206 may be a relational database that utilizes structured query language for the storage, identification, modifying, updating, accessing, etc. of structured data sets stored therein. Each rider profile 208 may be a structured data set configured to store data related to a registered passenger 106 in the system 100. A rider profile 208 may include at least a public key of a blockchain wallet associated with the related passenger 106, and may also include communication information for use in communicating with the passenger device 112 if opted-in by passenger 106 using their related passenger device 112, such as a device identifier, media access control address, internet protocol address, telephone number, e-mail address, etc. In some instances, a rider profile 208 may be used to store data regarding rash driving submissions and confirmation messages submitted by the related passenger 106.

The processing server 102 may include a querying module 218. The querying module 218 may be configured to execute queries on databases to identify information. The querying module 218 may receive one or more data values or query strings, and may execute a query string based thereon on an indicated database, such as the profile database 206, to identify information stored therein. The querying module 218 may then output the identified information to an appropriate engine or module of the processing server 102 as necessary. The querying module 218 may, for example, execute a query on the profile database 206 to identify a rider profile 208 associated with a confirmed passenger 106 of a vehicle 104 for use in submitting a confirmation request to the passenger device 112 associated with the passenger 106 for alleged rash driving.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate notifications and other data messages for transmission to passengers' devices 112, such as prompts for digital signatures, confirmation requests, etc., as well as for transmission to nodes in the blockchain network 110, such as transmitting new blockchain data values and/or blocks for verification and inclusion in the blockchain.

The processing server 102 may also include a validation module 222. The validation module 222 may be configured to perform validations for the processing server 102 as part of the functions discussed herein. The validation module 222 may receive data to be validated as input, may attempt the validation, and may output a result of the attempted validation to another module or engine of the processing server 102. In some cases, data to be used in the validation may be included in the input submitted to the validation module 222. In some instances, the validation module 222 may be configured to identify data for use in validations, such as by submitting instructions to the querying module 218 for querying data stored in the processing server 102. The validation module 222 may be configured to, for instance, validate digital signatures included in received rider embarkation, rider disembarkation, or rash driving notification messages using public keys, and to validate rash driving notifications based on received confirmation messages and data included therein.

The processing server 102 may also include a transmitting device 224. The transmitting device 224 may be configured to transmit data over one or more networks via one or more network protocols. In some instances, the transmitting device 224 may be configured to transmit data to passenger devices 112, onlooker devices 116, blockchain networks 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to registered passenger devices 112 and/or onlooker devices 116 that are superimposed or otherwise encoded with confirmation requests for rash driving, which may include vehicle identifiers, rash driving descriptions or other data, etc., as well as information regarding the confirmation of submitted rash driving notifications. The transmitting device 224 may also be configured to electronically transmit data signals to nodes in blockchain networks 110, which may be superimposed or otherwise encoded with new blockchain data values and/or blocks for confirmation and adding to the blockchain, or verifications of blocks or blockchain data values submitted to the processing server 102 for confirmation.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, communication data for passenger devices 112 and onlooker devices 116, rules for confirmation messages, predetermined numbers and percentages, etc.

Process for Identification and Confirmation of Rash Driving

Figure 3A:
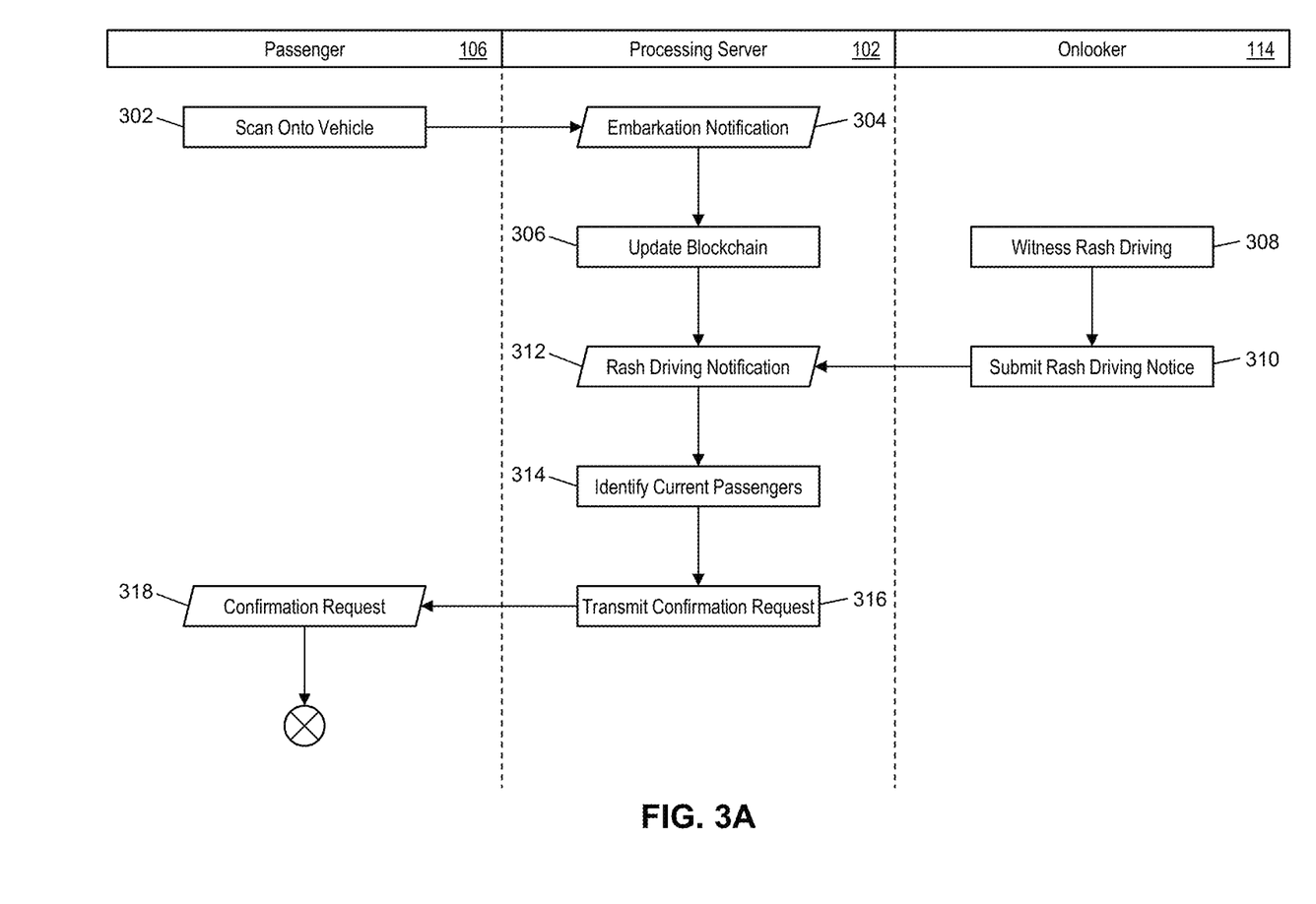
FIGS. 3A and 3B are a flow diagram illustrating a process for identifying and verifying rash driving using a blockchain in the system of FIG. 1 in accordance with exemplary embodiments.
Figure 3B:
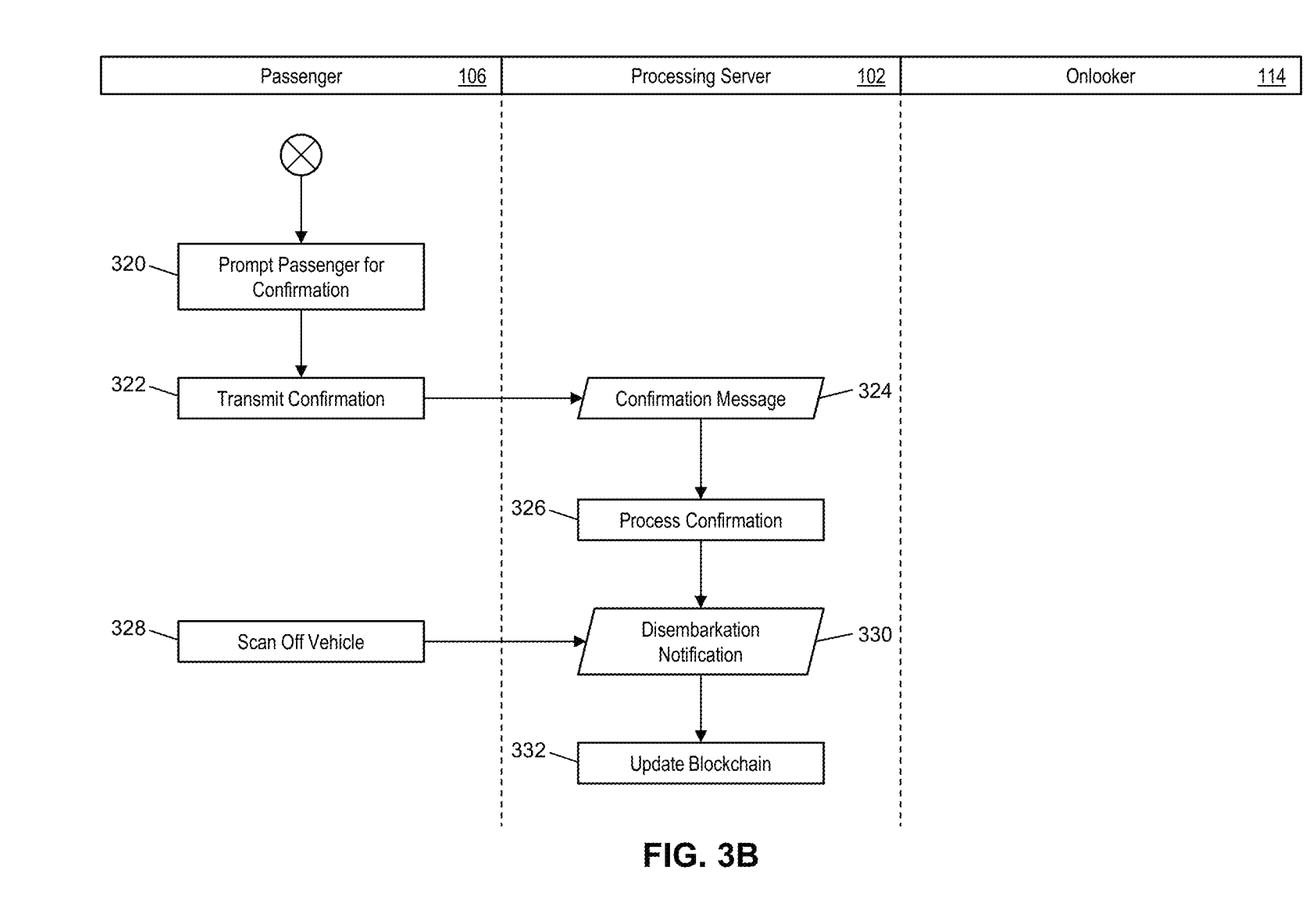

FIGS. 3A and 3B illustrate an example process for the identification of instances of rash driving and the confirmation thereof by registered passengers of a vehicle 104 as identified in a blockchain in the system 100 of FIG. 1.

In step 302, the passenger 106 may board the vehicle 104 and, as part of the boarding process, may use their passenger device 112 to scan a displayed machine-readable code to register their embarkation on the vehicle 104. The machine-readable code may be encoded with the vehicle identifier for the vehicle 104, which may be read by the passenger device 112 and initiate the transmission of a rider embarkation notification to the processing server 102. The rider embarkation notification may include the vehicle identifier and may also include a digital signature generated by the passenger device 112 using the blockchain wallet's private key. In step 304, the receiving device 202 of the processing server 102 may receive the rider embarkation notification using a suitable communication network and method.

In step 306, the blockchain may be updated to include the rider embarkation for the passenger 106. Updating of the blockchain may include validating, by the validation module 222 of the processing server 102, the digital signature using the public key of the passenger's blockchain wallet, and the generation of, by the generation module 220 of the processing server 102, a blockchain data value that includes the rider embarkation and a new block that includes a block header and one or more blockchain data values including the new blockchain data value. The new block may be transmitted, by the transmitting device 224 of the processing server 102, to other nodes in the blockchain network 110 for verification and inclusion into the blockchain.

In step 308, an onlooker 114 may witness rash driving by the vehicle 104. The onlooker 114 may use an application program on their onlooker device 116 to input details regarding the rash driving, such as the vehicle identifier of the vehicle 104 and a description of the rash driving. In step 310, the onlooker 114, using their onlooker device 116, may submit a rash driving notification to the processing server 102 using a suitable communication network and method. The rash driving notification may include at least the vehicle identifier and any description entered by the onlooker 114. In step 312, the receiving device 202 of the processing server 102 may receive the rash driving notification.

In step 314, the querying module 218 of the processing server 102 may execute a query on the memory 226 of the processing server 102 to identify passengers 106 on the vehicle 104 at the time of the witnessed rash driving by identifying blockchain data values for rider embarkations that include the vehicle identifier prior to the time of the witnessed rash driving. The querying module 218 may execute a query on the profile database 206 of the processing server 102 to identify a rider profile 208 for each of the passengers 106 identified as being on the vehicle 104 at the time of the alleged rash driving and identify communication data included therein. In step 316, the transmitting device 224 of the processing server 102 may electronically transmit a confirmation request to each of the passengers 106 via their passenger devices 112 using the identified communication data. In step 318, each passenger device 112 may receive the confirmation request, which may be displayed to the respective passenger 106.

In step 320, the passenger device 112 may prompt the passenger 106 to confirm the alleged rash driving. The passenger 106 may input their confirmation into the passenger device 112 using a suitable input method. In step 322, the passenger 106 may transmit their confirmation to the processing server 102 using the passenger device 112 via a suitable communication network and method. In step 324, the receiving device 202 of the processing server 102 may receive the confirmation message. In step 326, the processing server 102 may process the confirmation. Processing of the confirmation may include validating that the rash driving notification was confirmed, such as based on the receipt of a suitable number of confirmation messages confirming the alleged rash driving. Confirmation of the rash driving may also include generating, by the generation module 220 of the processing server 102, a new blockchain data value that includes the rash driving notification, which may be included in a new block that is generated and submitted to other nodes in the blockchain network 110.

In step 328, the passenger 106 may disembark from the vehicle 104. As part of the disembarkation, the passenger 106 may scan a machine-readable code displayed on the vehicle 104 that is encoded with the vehicle identifier for the vehicle 104, which may be read by the passenger device 112 and initiate the transmission of a rider disembarkation notification to the processing server 102. The rider embarkation notification may include the vehicle identifier and may also include a digital signature generated by the passenger device 112 using the blockchain wallet's private key. In step 330, the receiving device 202 of the processing server 102 may receive the rider disembarkation notification using a suitable communication network and method. In some cases, the rider disembarkation notification may have the same data as the rider embarkation notification, where the processing server 102 may identify that the notification is for disembarkation rather than embarkation due to the earlier rider embarkation notification. In step 332, the blockchain may be updated to include the rider disembarkation for the passenger 106. Updating of the blockchain may include validating, by the validation module 222 of the processing server 102, the digital signature using the public key of the passenger's blockchain wallet, and the generation of, by the generation module 220 of the processing server 102, a blockchain data value that includes the rider embarkation and a new block that includes a block header and one or more blockchain data values including the new blockchain data value. The new block may be transmitted, by the transmitting device 224 of the processing server 102, to other nodes in the blockchain network 110 for verification and inclusion into the blockchain.

Exemplary Method for Tracking Rash Driving

Figure 4:
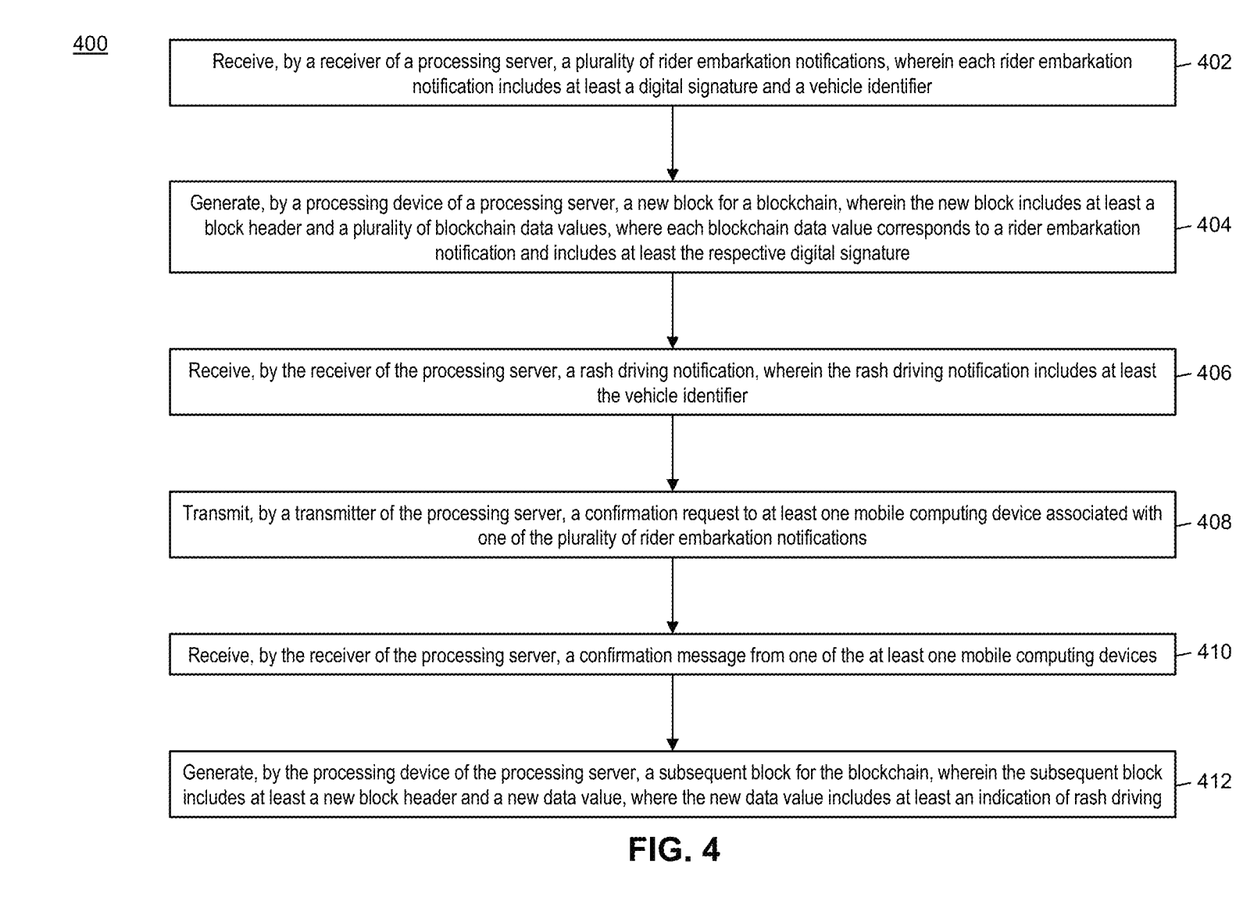
FIG. 4 is a flow chart illustrating an exemplary method for tracking rash driving in accordance with exemplary embodiments.

FIG. 4 illustrates a method 400 for the tracking of rash driving and confirmation thereof through the use of a blockchain for tracking passengers.

In step 402, a plurality of rider embarkation notifications may be received by a receiver (e.g., the receiving device 202) of a processing server (e.g., the processing server 102), wherein each rider embarkation notification includes at least a digital signature and a vehicle identifier. In step 404, a new block may be generated for a blockchain by a processing device (e.g., the generation module 220) of the processing server, wherein the new block includes at least a block header and a plurality of blockchain data values, where each blockchain data value corresponds to a rider embarkation notification and includes at least the respective digital signature.

In step 406, a rash driving notification may be received by the receiver of the processing server, wherein the rash driving notification includes at least the vehicle identifier. In step 408, a confirmation request may be transmitted by a transmitter (e.g., the transmitting device 224) of the processing server to at least one mobile computing device (e.g., passenger device 112) associated with one of the plurality of rider embarkation notifications.

In step 410, a confirmation message may be received by the receiver of the processing server from one of the at least one mobile computing devices. In step 412, a subsequent block may be generated by the processing device of the processing server for the blockchain, wherein the subsequent block includes at least a new block header and a new data value, where the new data value includes at least an indication of rash driving.

In one embodiment, the rash driving notification may further include description data, and the confirmation request may further include the description data. In a further embodiment, the indication of rash driving may include the description data. In some embodiments, the new data value may further include the vehicle identifier.

In one embodiment, the rash driving notification may further include a new digital signature. In a further embodiment, each digital signature included in a rider embarkation notification may be generated using a rider private key, the new digital signature may be generated using a new private key, and the at least one mobile computing device the confirmation request may be transmitted to is associated with a rider embarkation notification that includes a digital signature generated using a rider private key different from the new private key.

In some embodiments, the method 400 may further include storing, in a profile database (e.g., profile database 206) of the processing server, a plurality of rider profiles (e.g., rider profiles 208), wherein each rider profile includes at least a public key and communication data. In a further embodiment, the method 400 may also include: identifying, by the processing device of the processing server, a specific rider profile that includes communication data associated with the one of the at least one mobile computing devices; and validating, by the processing device of the processing server, an additional digital signature included in the confirmation message using the public key included in the specific user profile.

Computer System Architecture

Figure 5:
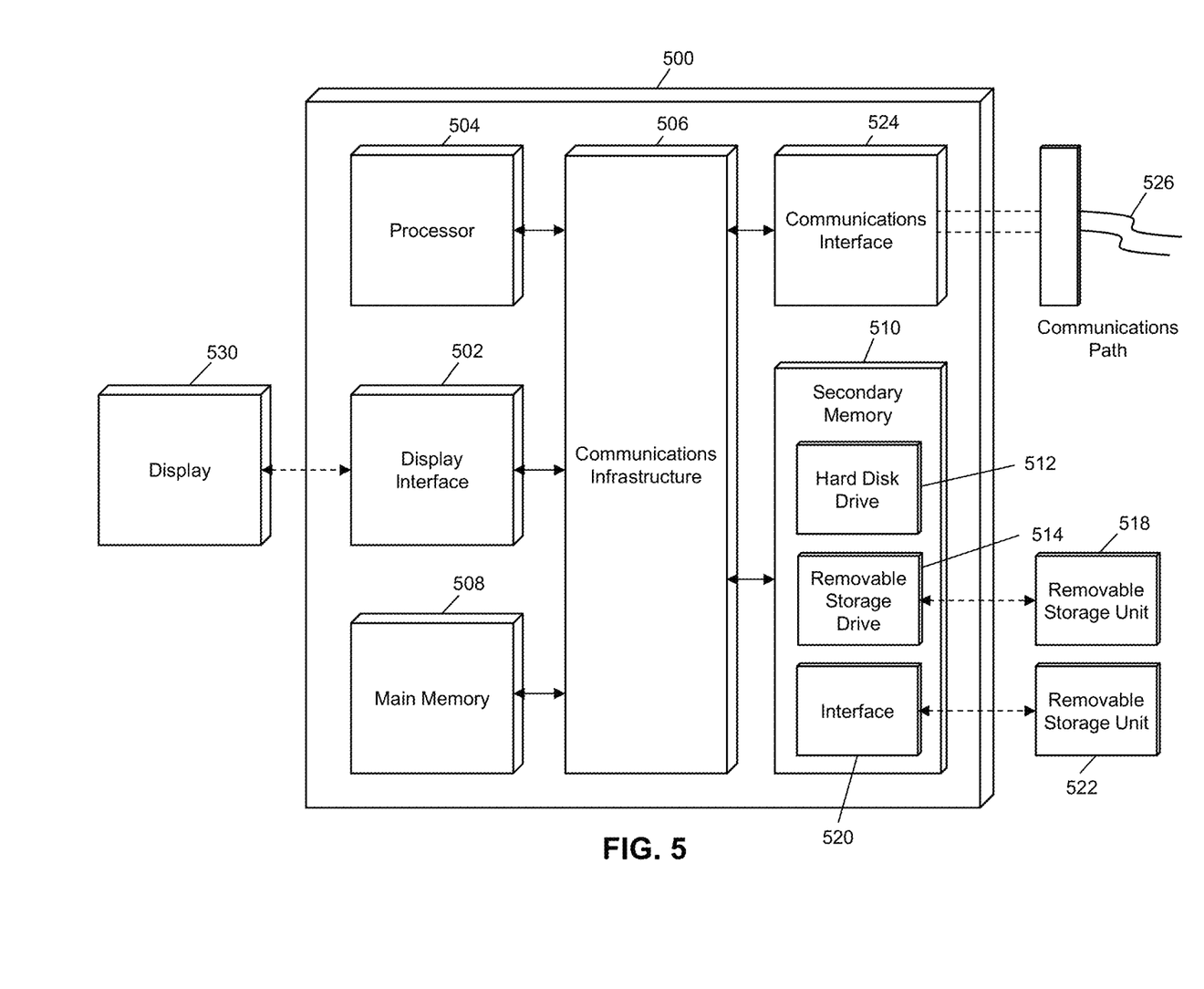
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for tracking rash driving. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for tracking rash driving, comprising:
   receiving, by a receiver of a processing server, a plurality of rider embarkation notifications, wherein each rider embarkation notification includes at least a digital signature and a vehicle identifier and wherein a respective rider is on a vehicle identified by the vehicle identifier;
   generating, by a processing device of a processing server, a new block for a blockchain, wherein the new block includes at least a block header and a plurality of blockchain data values, where each blockchain data value corresponds to a rider embarkation notification and includes at least the respective digital signature;
   receiving, by the receiver of the processing server, a rash driving notification from at least one of a rider on the vehicle or an onlooker to the vehicle, wherein the rash driving notification includes at least the vehicle identifier;
   transmitting, by a transmitter of the processing server, a confirmation request to at least one mobile computing device of at least one respective rider on the vehicle, said at least one mobile computing device being associated with one of the plurality of rider embarkation notifications;
   receiving, by the receiver of the processing server, a confirmation message from one of the at least one mobile computing devices; and generating, by the processing device of the processing server, a subsequent block for the blockchain, wherein the subsequent block includes at least a new block header and a new data value, where the new data value includes at least an indication of rash driving.

2. The method of claim 1, wherein
the rash driving notification further includes description data, and
the confirmation request further includes the description data.

3. The method of claim 2, wherein the indication of rash driving includes the description data.

4. The method of claim 1, wherein the new data value further includes the vehicle identifier.

5. The method of claim 1, wherein the rash driving notification further includes a new digital signature.

6. The method of claim 5, wherein
each digital signature included in a rider embarkation notification is generated using a rider private key,
the new digital signature is generated using a new private key, and
the at least one mobile computing device the confirmation request is transmitted to is associated with a rider embarkation notification that includes a digital signature generated using a rider private key different from the new private key.

7. The method of claim 1, further comprising:
storing, in a profile database of the processing server, a plurality of rider profiles, wherein each rider profile includes at least a public key and communication data.

8. The method of claim 7, further comprising:
identifying, by the processing device of the processing server, a specific rider profile that includes communication data associated with the one of the at least one mobile computing devices; and
validating, by the processing device of the processing server, an additional digital signature included in the confirmation message using the public key included in the specific user profile.

9. A system for tracking rash driving, comprising:
a receiver of a processing server configured to receive a plurality of rider embarkation notifications, wherein each rider embarkation notification includes at least a digital signature and a vehicle identifier and wherein a respective rider is on a vehicle identified by the vehicle identifier;
a processing device of a processing server configured to generate a new block for a blockchain, wherein the new block includes at least a block header and a plurality of blockchain data values, where each blockchain data value corresponds to a rider embarkation notification and includes at least the respective digital signature; and
a transmitter of the processing server, wherein the receiver of the processing server is further configured to receive a rash driving notification from at least one of a rider on the vehicle or an onlooker to the vehicle, wherein the rash driving notification includes at least the vehicle identifier,
the transmitter of the processing server is configured to transmit a confirmation request to at least one mobile computing device of at least one respective rider on the vehicle, said at least one mobile computing device being associated with one of the plurality of rider embarkation notifications,
the receiver of the processing server is even further configured to receive a confirmation message from one of the at least one mobile computing devices, and
the processing device of the processing server is further configured to generate a subsequent block for the blockchain, wherein the subsequent block includes at least a new block header and a new data value, where the new data value includes at least an indication of rash driving.

10. The system of claim 9, wherein
the rash driving notification further includes description data, and
the confirmation request further includes the description data.

11. The system of claim 10, wherein the indication of rash driving includes the description data.

12. The system of claim 9, wherein the new data value further includes the vehicle identifier.

13. The system of claim 9, wherein the rash driving notification further includes a new digital signature.

14. The system of claim 13, wherein
each digital signature included in a rider embarkation notification is generated using a rider private key,
the new digital signature is generated using a new private key, and
the at least one mobile computing device the confirmation request is transmitted to is associated with a rider embarkation notification that includes a digital signature generated using a rider private key different from the new private key.

15. The system of claim 9, further comprising:
a profile database of the processing server configured to store a plurality of rider profiles, wherein each rider profile includes at least a public key and communication data.

16. The system of claim 15, wherein the processing device of the processing server is further configured to
identify a specific rider profile that includes communication data associated with the one of the at least one mobile computing devices, and
validate an additional digital signature included in the confirmation message using the public key included in the specific user profile.

\* \* \* \* \*